(12) United States Patent
Matsutsuka

(10) Patent No.: US 8,078,987 B2
(45) Date of Patent: Dec. 13, 2011

(54) DISPLAY SCREEN GENERATING APPARATUS

(75) Inventor: Takahide Matsutsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 708 days.

(21) Appl. No.: 11/970,931

(22) Filed: Jan. 8, 2008

(65) Prior Publication Data

US 2008/0184144 A1 Jul. 31, 2008

(30) Foreign Application Priority Data

Jan. 10, 2007 (JP) .................................... 2007-2864

(51) Int. Cl.
*G06F 3/14* (2006.01)
*G06F 3/17* (2006.01)
(52) U.S. Cl. ........ 715/792; 715/764; 715/786; 345/581; 345/764; 707/3; 455/414.1
(58) Field of Classification Search .......... 715/200–277, 715/700–867; 700/701–866; 709/201–229; 705/50–79; 345/30–111, 581, 764; 707/1–10, 707/100–104.1, 200–206; 455/414.1
See application file for complete search history.

(56) References Cited

U.S. PATENT DOCUMENTS

| | | | |
|---|---|---|---|
| 6,556,222 B1 * | 4/2003 | Narayanaswami | 715/786 |
| 6,704,024 B2 * | 3/2004 | Robotham et al. | 345/581 |
| 2002/0089542 A1 * | 7/2002 | Imamura | 345/764 |
| 2006/0073816 A1 * | 4/2006 | Kim et al. | 455/414.1 |
| 2009/0171910 A1 * | 7/2009 | Sarkeshik | 707/3 |

FOREIGN PATENT DOCUMENTS

JP 2002-215394 8/2002

OTHER PUBLICATIONS

Tohoho, "Form", [online], Aug. 25, 2001, JavaScript reference of Tohoho, [searched on May 21, 2009], Internet <URL:http://www.tohoho-web.com/js/form.htm>.
"Set up slide-show (manual reproduction) with JavaScript", [online], Sep. 8, 2006, [searched on May 21, 2009], Internet <URL:http://plusone.jpn.org/javascript/sample/pic/slide.html>.
"Operate Main Window from Small Window", [online], Nov. 8, 2001, [searched on May 21, 2009], Internet <URL:http://www.sky.sannet.ne.jp/masapine/java_newwindow7.html>.
Japanese Notice of Rejection mailed Jun. 2, 2009 in corresponding Japanese Application No. 2007-002864 (6 pages) (9 pages of English Translation.

* cited by examiner

*Primary Examiner* — Ruay Ho
(74) *Attorney, Agent, or Firm* — Staas & Halsey LLP

(57) ABSTRACT

According to an aspect of an embodiment, a display screen having multiple functions is displayed by a computer that processes a screen part for displaying the display screen and for receiving an event from the user. The computer processes a functional part provided separately from the screen part and provided per content of an input event received via the screen part, and based on the content of the event input, passes a processing result to the screen part for reflecting the processing result on the screen display.

6 Claims, 12 Drawing Sheets

Processing here differs depending on functional part

F I G. 11
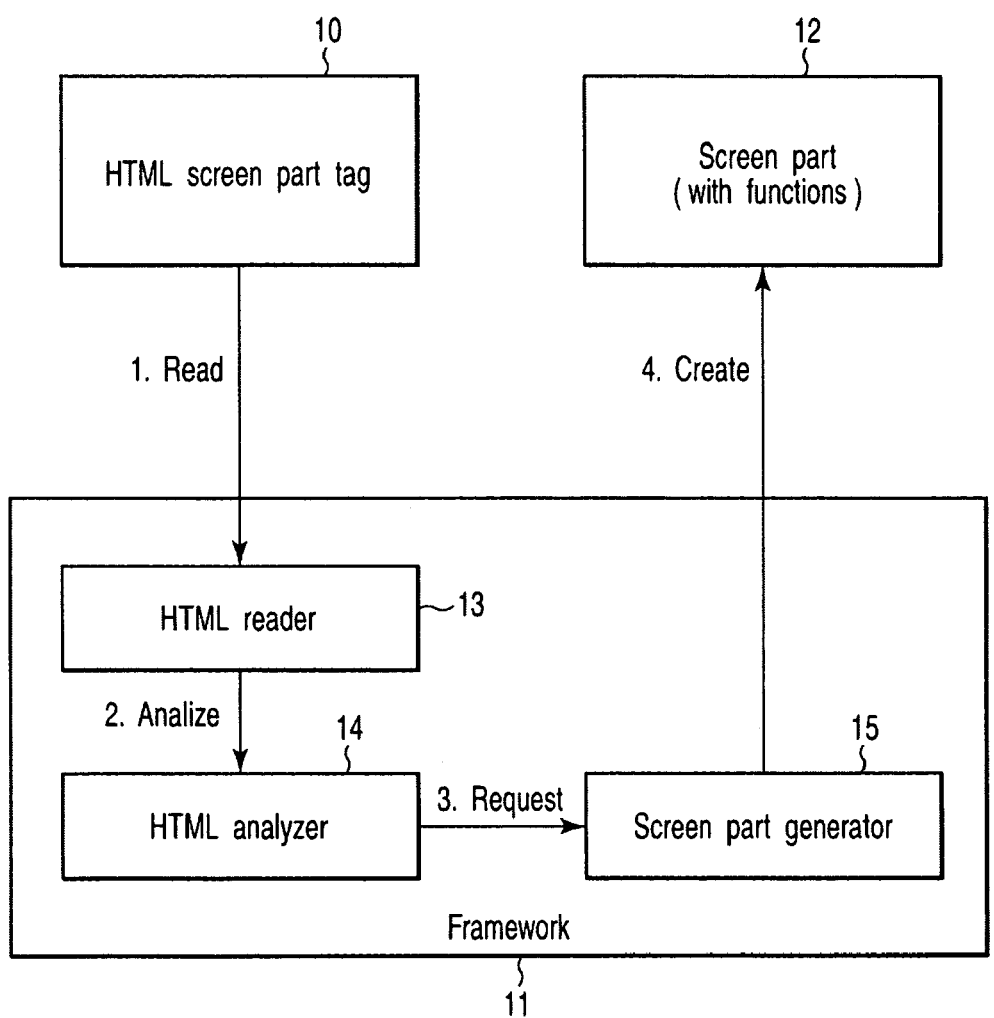

DISPLAY SCREEN GENERATING APPARATUS

This application is based upon and claims the benefit of priority from the prior Japanese Patent Application No. 2007-2864, filed on Jan. 10, 2007, the entire contents of which are incorporated herein by reference.

BACKGROUND

1. Field

The embodiments relate to a computer display screen generating apparatus to display a display screen of a computer.

2. Description of the Related Art

Usually, a method that displays a display screen of a computer on the computer screen and allows a user to input from the display screen is performed on using a computer. In this case, in an application such as a web browser executed on a computer, a program displayed on a screen is created as a screen part. The screen part is created per screen displayed on the screen.

FIG. 11 and FIG. 12 are explanatory drawings of conventional art taking a web browser as an example.

FIG. 11 is a figure to explain the conventional operation by a browser at initialization to display a screen. In the browser, a program called Framework 11 is loaded to load and analyze HTML, and execute processing according to the analysis. HTML reader 13 of the Framework 11 loads HTML screen part tag 10 described on such as a web page, and passes it to HTML analyzer 14. The HTML analyzer 14 requests a screen part generator 15 that is a program to analyze a HTML screen part tag and display a screen according to the analysis, to create a screen part. The created screen part 12 is displayed on the browser at display operation as a screen with functions.

FIG. 12 is a figure that explains the conventional display event processing operation by a browser. HTML DOM (HTML Document Object Model) 20 is a processing function of a standard HTML document implemented in the browser. When an event is generated in the browser, the generation of the event is notified to an event analysis part 22 of a screen part 21, and DOM operation that operates the screen part generated at initialization is performed to the screen part operation part 23 according to the contents of the event. At this time, the screen part operation part 23 refers to the screen operation library 24 if necessary.

SUMMARY

According to an aspect of an embodiment, a computer-readable medium stores a program for a display screen generating apparatus to configure a display screen having multiple functions displayed on a computer, according to operations of making the computer function as a screen part provided per display screen and that displays the display screen, and receives an event from the user and making the computer function as a functional part provided separately from the screen part and provided per content of an input event received via the screen part, which processes the input event based on a content of the event input, passes the processing result to the screen part, and reflects the processing result on the screen display.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 11 is a diagram of a conventional initialization for a display operation by a web browser;

DETAILED DESCRIPTION OF THE PREFERRED EMBODIMENTS

According to an aspect of the embodiments, the conventional screen parts with functions are divided into "screen parts" and "functional parts." The screen parts are parts that display on so-called screens and are equivalent to conventional basic screen parts. To make these parts advanced parts, users do not add functions to the screen parts but separately create "functional parts" in which only functions are mounted. By combining the screen parts and the functional parts, advanced screen parts can be obtained.

The screen parts and the functional parts are connected on an event basis. For example, if any operation is performed by a user on the screen parts, the event is transmitted to the functional parts. In the functional parts, it performs a prescribed processing depending on the event and the processing result is returned to the screen part. The screen part can operate as an advanced part by drawing the screen according to the returned result.

By utilizing a concept as a functional part, the functionality of the screen part can be reinforced without modifying the screen part itself at all. In addition, if multiple functional parts have the same function, the functions of plural kinds of screen parts can be reinforced by adding the same functional parts to the plural kinds of screen parts. Oppositely, two or more functional parts can be added to one screen part. As a result, when it is wanted to create a screen part having various functions, it can prevent a program of function from being complicated because it is possible to create a functional part per function.

Figure 1:
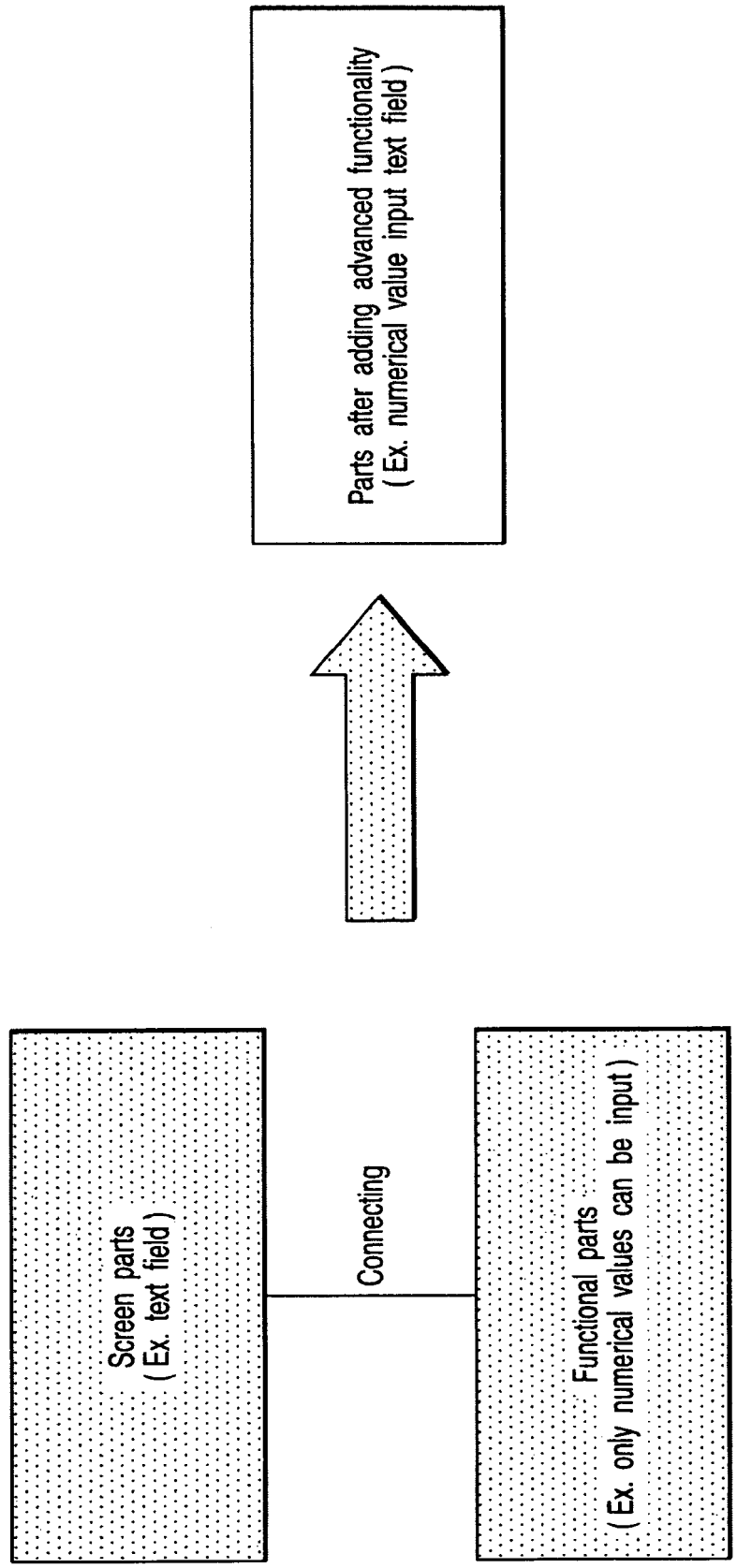
FIG. 1 is a diagram of a screen part and a functional part for displaying a computer display screen, according to an embodiment.
Figure 2:
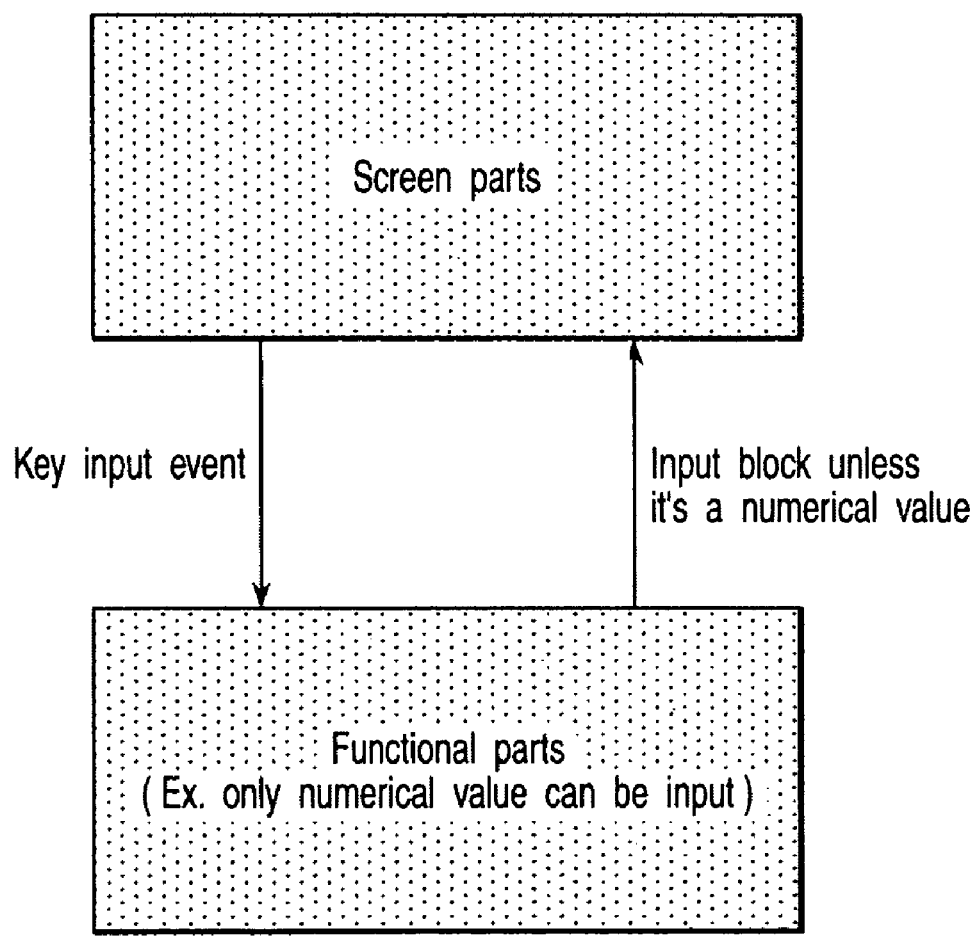
FIG. 2 is a diagram of an event processing operation by the screen part and the functional part for displaying the computer display screen, according to an embodiment.

FIG. 1 is a diagram of a screen part and a functional part for displaying a computer display screen, according to an embodiment. FIG. 2 is a diagram of an event processing operation by the screen part and the functional part for displaying the computer display screen, according to an embodiment.

In the embodiment, two kinds of components that are "screen parts" and "functional parts" are defined. And, it becomes possible to display the screen with a prescribed function by connecting the screen parts with the functional parts.

The screen parts are in charge of screen display and an input by the user. In HTML, such as the plaintext, <input> tag, and <select> tag that are directly displayed on the screen and can receive an input by the user are indicated. The functional parts that are not directly displayed on the screen, though define various operations in cooperation with the screen parts are indicated. In addition, "a Framework" to drive these exists. The framework analyzes HTML and creates parts.

FIG. 1 shows the display of the text field as an example of the screen parts and the function that permits only an input of a numerical value as an example of the functional part. By connecting this function that permits only an input of a numerical value with the text field displayed by the screen parts, the screen after adding advanced functionality that is to display the text field for an input of a numerical value can be displayed. As shown in FIG. 2, as the operation at this time, the screen parts notify an event occurred including a key input by the user to the functional parts. Because the functional parts permit an input of only numerical values, if a key-input text is not a numerical value, the functional parts perform an operation to block the input and make the screen parts display it.

Operation is divided into initializing and running.

Figure 3:
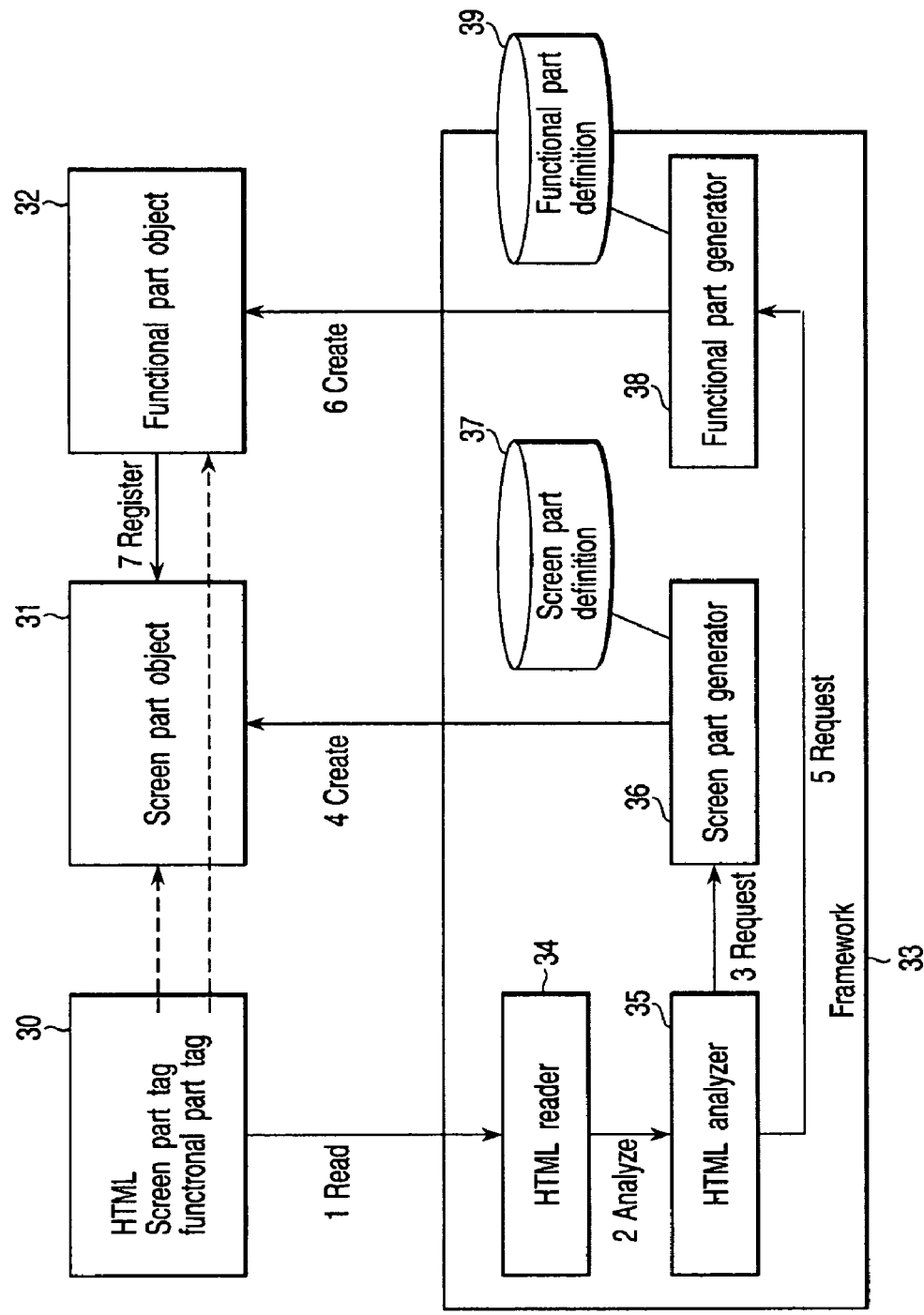
FIG. 3 is a functional block diagram of initializing a screen part and a functional part for displaying a computer display screen, according to an embodiment.
Figure 4A:
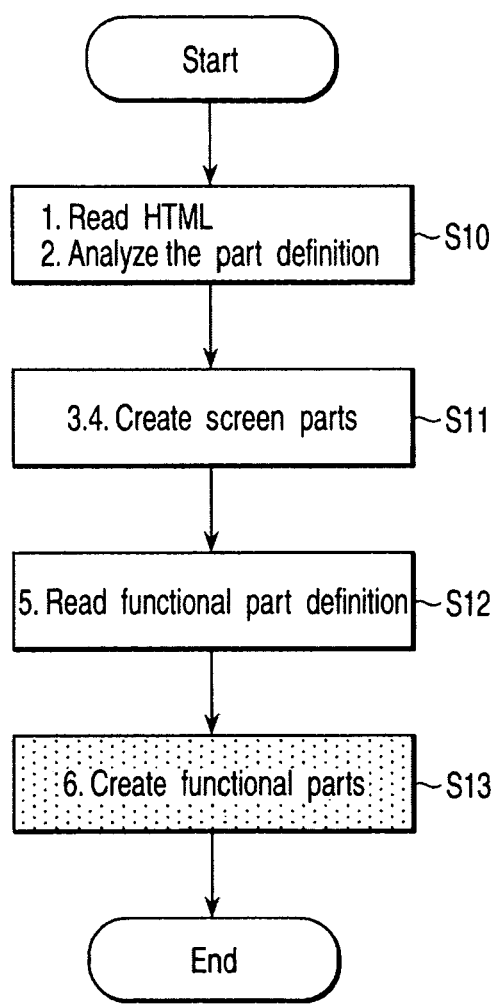
FIGS. 4A-4B are flowcharts of initializing the screen part and the functional part for displaying the computer display screen, according to an embodiment.
Figure 4B:
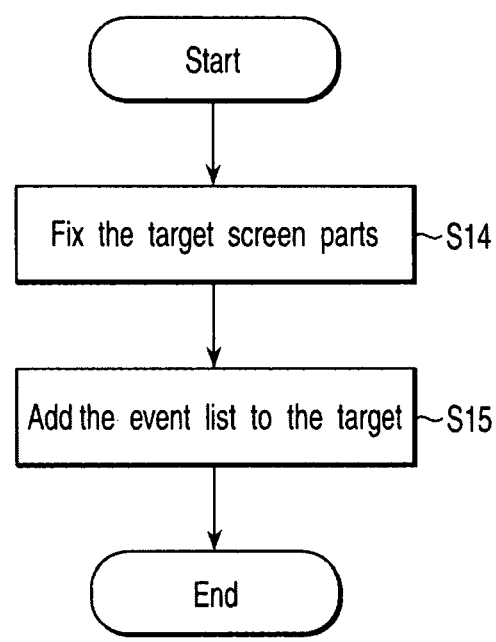

FIG. 3 is a functional block diagram of initializing a screen part and a functional part for displaying a computer display screen, according to an embodiment and FIGS. 4A-4B are flow charts of initializing the screen part and the functional part for displaying the computer display screen, according to an embodiment.

In FIG. 3, a HTML reader 34 reads HTML 30 comprising a screen part tag and a functional part tag downloaded by a framework 33 programmed in JAVASCRIPT and a HTML analyzer 35 analyzes this. Depending on an analysis content, a screen part generator 36 or a functional part generator 38 creates the screen part or the functional part and displays it on the screen. When the screen part generator 36 creates the screen parts, it refers to screen part definition information 37. The screen parts created by the screen part generator 36 perform screen display as a screen part object 31. The screen part object 31 is generated corresponding to the screen part tag of HTML 30. In addition, when the functional part generator 38 creates the functional parts, it refers to functional part definition information 39. The functional parts created by the functional part generator 38 becomes the functional part object 32 and performs prescribed processing depending on the event generated on the screen displayed by the screen parts. The functional part object 32 is generated corresponding to the functional part tag of HTML 30. The functional part object 32 is registered to the screen part object 31. That is, it is registered to which part of the screen displayed by the screen part object 31, the function supplied by the functional object 32 will be added. By this registration, the screen part object 31 and the functional part object 32 are associated and a screen having a prescribed function will be able to be displayed.

In concrete terms, when a browser downloads HTML 30, the framework 33 is downloaded by a read instruction of JAVASCRIPT for the framework 33 described there. The script to download the framework 33 is described in HTML as follows:

<script src="rcf.js"></script>

Though the framework 33 may comprise multiple script files, for rcf.js to read another file automatically, only the above read instruction has to be described by the user. When a read of HTML ends, operation of the framework 33 starts. First of all, the framework 33 analyzes HTML. Then, it creates the screen parts and the functional parts according to the tag described in HTML.

These parts are described with (in an unlimiting example) <div> tag or <span> tag of HTML, and for example, they are described as follows:

An example of the screen parts:

<span rcf:id="zip" rcf:type="TextInput" rcf:
    value="1234567"></span>

An example of the functional part:

<div rcf:id="limiter" rcf:
    type="NumericalsOnlyLimiter" rcf:
    target="zip"></div>

Here, there are following attributes used commonly.

rcf:id shows a unique ID of a part. It is used when another part indicates this part, etc.

rcf:type shows a kind of a part.

Depending on the character string that shows the kind, which part is described is decided.

In the above example, each part has following meaning.

The screen part is a "TextInput" part (character string input part) having an ID called "zip" and the value of initial display is "1234567.

The functional parts are "NumericalsOnlyLimiter" parts (value input limitation parts) having an ID called "limiter," and the IDs of the screen parts that these functional parts target is shown in "zip."

The HTML analyzer 35 reads the corresponding part from the repository of the screen part definition 37 or the functional part definition 39 according to the value of the rcf:type attribute described in each part. Then, objects 31 and 32 of the part are created.

Here, the screen parts are created earlier than the functional parts. As a result, when the functional parts are created, the screen parts that target the functional parts to register can surely be found. For example, in the above example, a part called zip that is a target of a part called limiter can be found.

Oppositely, it is also possible to create all the functional parts first and after that all the screen parts. In this case, the direction of registration reverses. That is, the screen parts indicate the functional parts.

In case of reversing the registration direction, an example of screen parts: <span rcf:id="zip" rcf:type="TextInput" rcf: value="1234567" target="limiter"></span>.

An example of functional parts: <div rcf:id="limiter" rcf: type="NumericalsOnlyLimiter"> </div>.

Because only the registration direction of the screen parts and the functional parts reverses and the rest can be initialized and operated in the same way, in the future, if the functional parts that explain on the assumption that "the functional parts indicate the screen parts" are created, this functional part object 32 registers itself to the targeting screen part object 31. As a result, it can be judged to which functional part object 32 the screen part object 31 should notify the event when operating. There are two kinds of mechanisms of registration.

The first mechanism is a method of preparing API (Application Program Interface) to register in the superclasses of the screen parts beforehand. As a result, the functional parts can be registered to the screen parts at any time. However, the screen parts have to succeed any specific superclass to be mounted.

The second mechanism is a method of dynamically adding API to register to objects of the screen parts. JAVASCRIPT makes this possible (called mixin). Because API can be added if necessary when operating, the functional parts can be registered in the screen parts even with the screen parts that have not succeeded to superclasses of the screen parts prepared beforehand.

If all of the screen part objects 31 and the functional part objects 32 gather, initialization is completed. FIG. 4A is a processing flow at initialization.

As shown in FIG. 4A, in S10, the HTML reader 34 first reads HTML and the HTML analyzer 35 analyzes the definition of the screen parts and the functional parts described in HTML. In S11, the screen part generator 36 creates the screen parts. In S12, the functional part generator 38 reads the functional part definition. In S13, the functional part generator creates the functional parts.

FIG. 4B is a processing flow after creating the functional parts. In S14, the screen parts to functions registration is fixed or completed. In S15, an event list (a list to show which event to notify the functional parts when it occurs) is added to the targeting screen parts.

Figure 5:
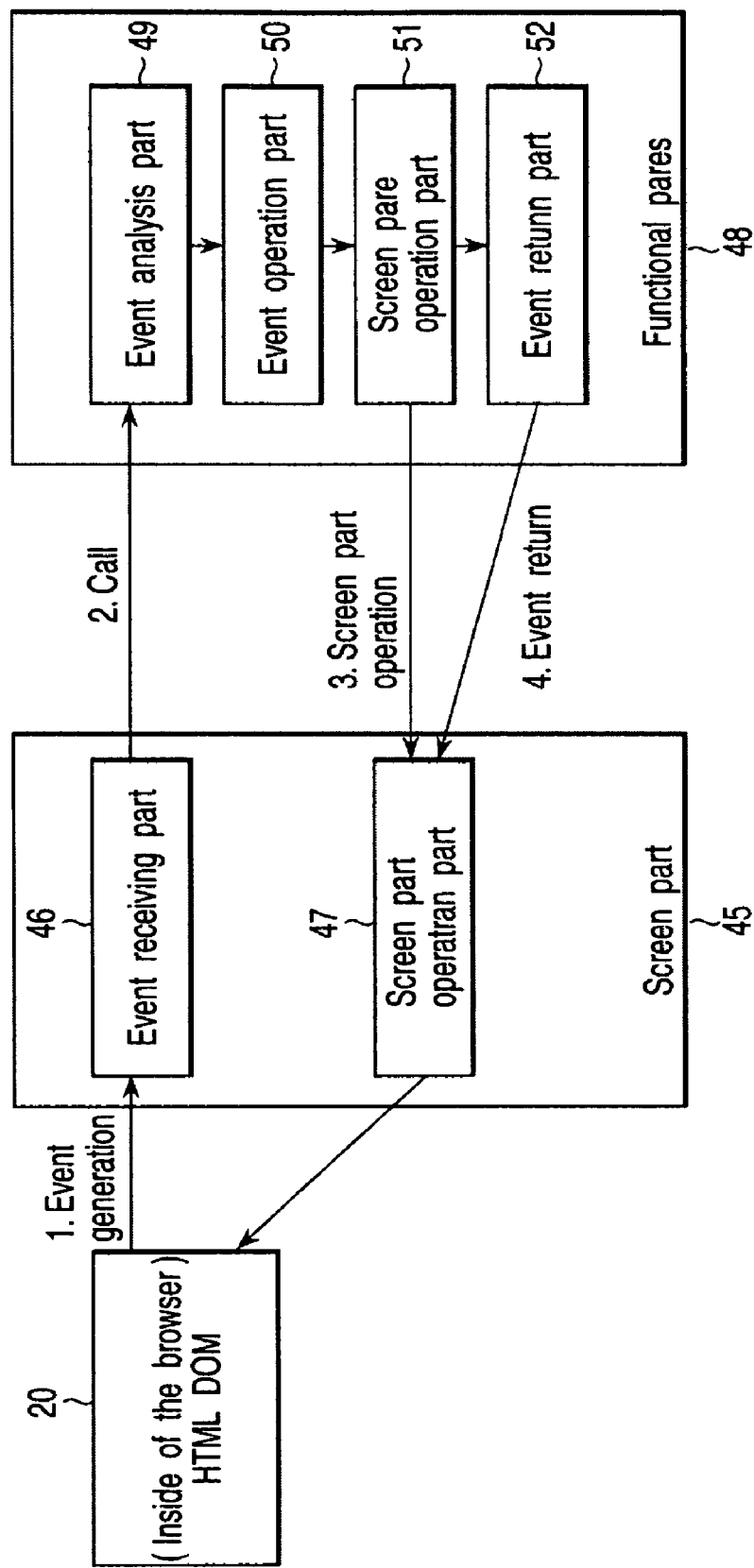
FIG. 5 is a functional block diagram of processing at the operation when the screen is displayed and the event is generated, according to an embodiment.
Figure 6A:
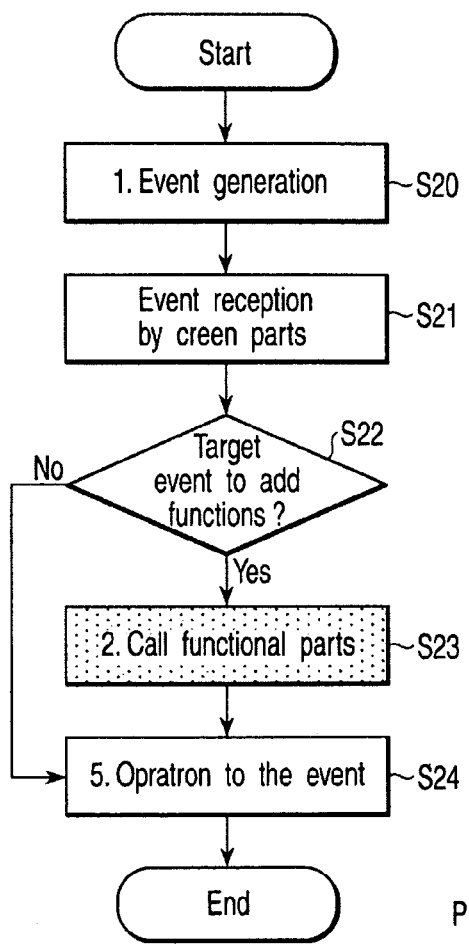
FIGS. 6A-6B are flow charts of processing at the operation when the screen is displayed and the event is generated, according to an embodiment.
Figure 6B:
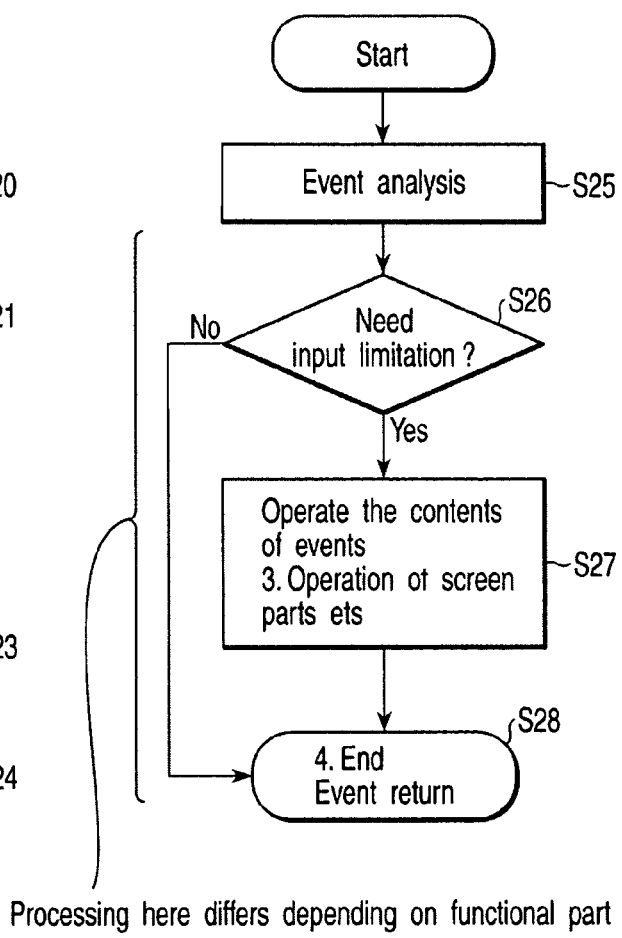

FIG. 5 and FIGS. 6A-6B are figures to explain the processing at operating when a screen is displayed and an event is generated. FIG. 5 is a functional block diagram and FIGS. 6A and 6B are flow charts. At operating, the procedure below like the figure is executed.

First of all in FIG. 5, an event is generated from the inside of the browser 20, and the event receiving part 46 of the screen part 45 receives this. If the functional part 48 is not associated with the screen part 45, nothing is especially done, and the screen parts 45 perform operation according to the event. For example, the input character is displayed on the screen when there is key input.

If the functional part 48 is associated with the screen part 45, the event is transmitted to the functional part 48 specified beforehand at initializing. The functional part 48 analyzes the event in an event analysis part 49, and judges whether it is an event needs to be processed. If processing is necessary, an event operation part 50 operates (processes) the event, and the screen part operation part 51 operates the screen parts. The screen parts are operated by calling API prepared beforehand in the screen, and/or changing the event itself. The event is returned to the screen part operation part 47 of the screen parts 45 by the event return part 52, and screen part operation is performed by the screen part operation part 47 of the screen parts 45 and by the screen part operation part 51 of the functional parts 48. As a result, eventually, the contents operated by the browser are changed.

For example, it is assumed that the functional parts 48 have a function "Only the numerical value can be input." The functional parts 48 judge whether the event is key input or not and if it's key input, they judge which key was pressed. At this time, if a key other than a numerical value was pressed, this is regarded as "No key was pressed" and the event is operated. And, by returning this event to the screen parts, it is understood that "No key was pressed" in the screen parts and the screen display of the browser won't change. "Thus, "Only the numerical value is input" is realized. The functional parts realize not only "Only the numerical value is input" but also they can realize various things. The concrete technique for programming of the functional parts will be easily understood by those skilled in the art. Some example functional parts in this case could be: Only a numerical value can be input, or only double-byte character can be input, or Mask input (input in blanks such as date_____month_____ year_____), or Check of input values, or Enable to drag & drop target parts, or Automatic supplementation of input (Candidates are displayed depending on the input content), or Automatic format of input values (For example, if 1000 is input, "\1000" is displayed), or Automatic escape of cursor or automatic change of focus, or Customization of default operation of other screen parts, etc., or any combinations thereof.

The point is the event generated from the inside of the browser, that is, the event received by the screen parts is transmitted to the functional parts and the functional parts can operate and modify the screen parts based on the event.

FIGS. 6A and 6B are processing flows at screen display and at operation of event processing, according to an embodiment.

In FIG. 6A, when the event is generated inside the browser in S20, the screen part receives the event in S21. In S22, it is judged whether functions were added to the received event, that is, whether it is necessary to proceed the event by a prescribed function. If the judgment result in S22 is No, it proceeds S24. If the judgment result in S22 is Yes, the functional parts are called and processing is performed in S23, and operation to the event is performed and processing is ended in S24.

FIG. 6B shows the processing of the functional parts.

In S25, the event analysis part 49 analyzes the event and judges whether the input limitation to the text field should be performed or not in S26. It proceeds to S28 when the judgment of S26 is No. When the judgment of S26 is Yes, the event operation part 50 operates the contents of the event in S27. For example, the screen parts are operated. And, the event return part 52 returns the event to the screen parts and processing is ended in S28. Though in S26 and S27, examples of input limitation function were explained, these operations can take different processing per functional part depending on the content owned by functional part.

Figure 7:
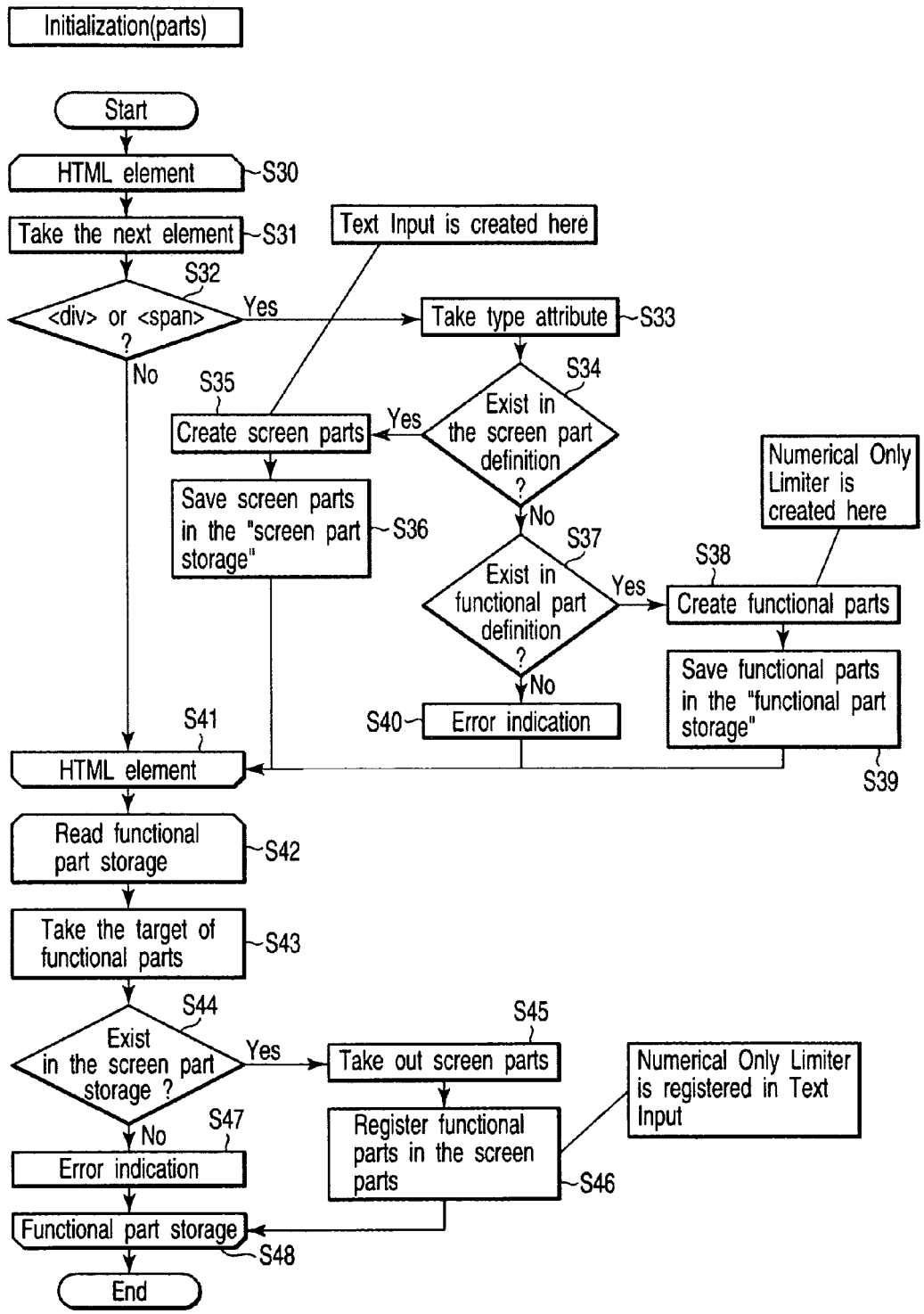
FIG. 7 is an overall detailed processing flow chart at display screen generation initialization operation, according to an embodiment.

FIG. 7 is an overall detailed processing flow at display screen generation initialization, according to an embodiment.

First of all, the screen parts and the functional parts are created in the loop between S30 and S41. In S31, the HTML reader 34 takes the element of the description of HTML sentence. In S32, it is judged whether the element taken is <div> or <span>. It proceeds to S41 when the judgment of S32 is No. When the judgment of S32 is Yes, type attributes of the description sentences of the above-mentioned screen parts or functional parts are acquired in S33. It is judged whether the acquired type attribute exists in the screen part definition in S34 or not. When the judgment of S34 is Yes, the screen part generator 36 creates the screen parts in S35. In the above-mentioned example, the screen parts of TextInput that is a text input field are created. And, the screen parts are saved in a prescribed memory area (here, it is assumed to be a "screen part storage"), and it proceeds to S41 in S36. When the judgment of S34 is No, it is judged whether the type attribute acquired in S33 exists in the functional part definition in S37 or not. When the judgment of 37 is No, an error indication is generated in S40 and it proceeds to S41. When the judgment of S37 is Yes, the functional part generator 38 creates the functional parts in 38. In the above-mentioned example, NumericalOnlyLimiter that limits the input string only to numerical values is created here. Then, in S39, the functional parts are saved in the prescribed save area (Here, it is assumed to be a "functional part storage"), and it proceeds to S41.

In the loop between S30 and S41, if check of description element of all HTML sentences finishes, the screen parts and the functional parts are associated in the loop between S42 and S48. In S42, the functional storage part is read. First of all, in S43, an ID specified with the target of the functional part is acquired in S43. And, in S44, it is judged whether the screen parts having acquired IDs exist in the screen part storage or not. When the judgment of S44 is No, an error indication is generated in S47 and it proceeds to S48. When the judgment in S44 is Yes, the screen parts are taken out of the screen part storage in S45, and the functional parts are registered in the screen parts in S46. In the above-mentioned example, NumericalOnlyLimiter is registered in TextInput. And, it proceeds to S48, similar processing is performed about all the functional parts stored in the functional part storage, and processing is ended.

Figure 8:
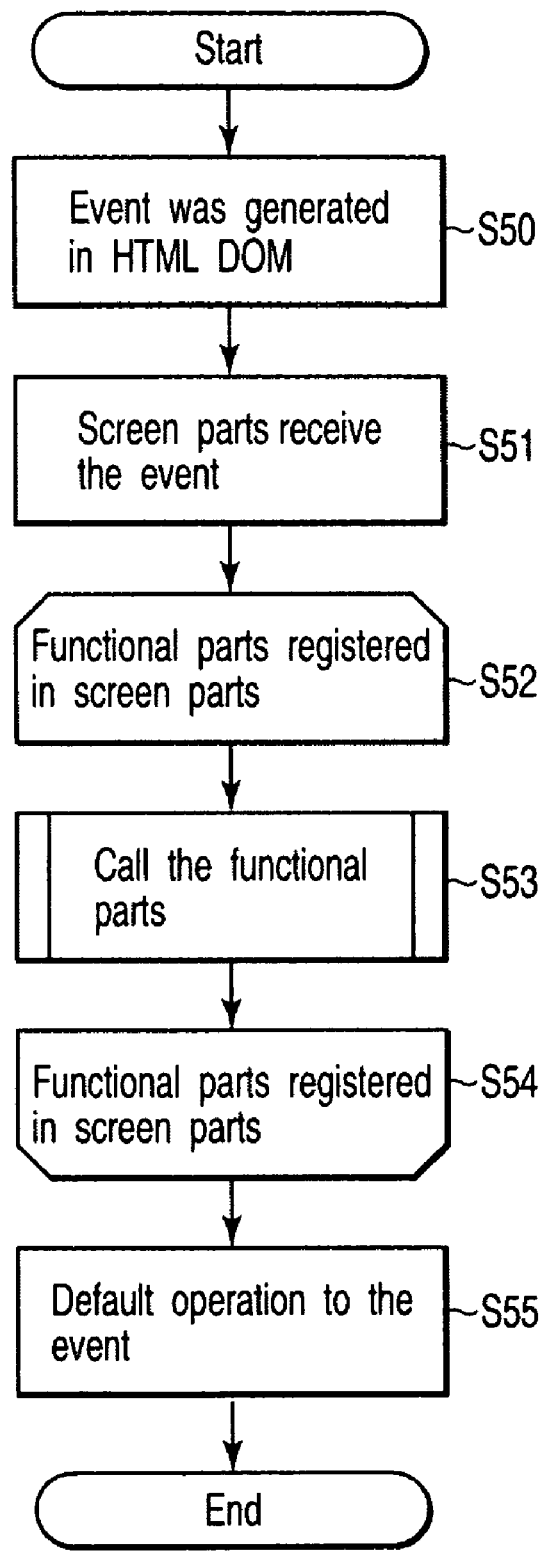
FIGS. 8-10 are detailed flowcharts of processing a computer display screen event, according to an embodiment.
Figure 9:
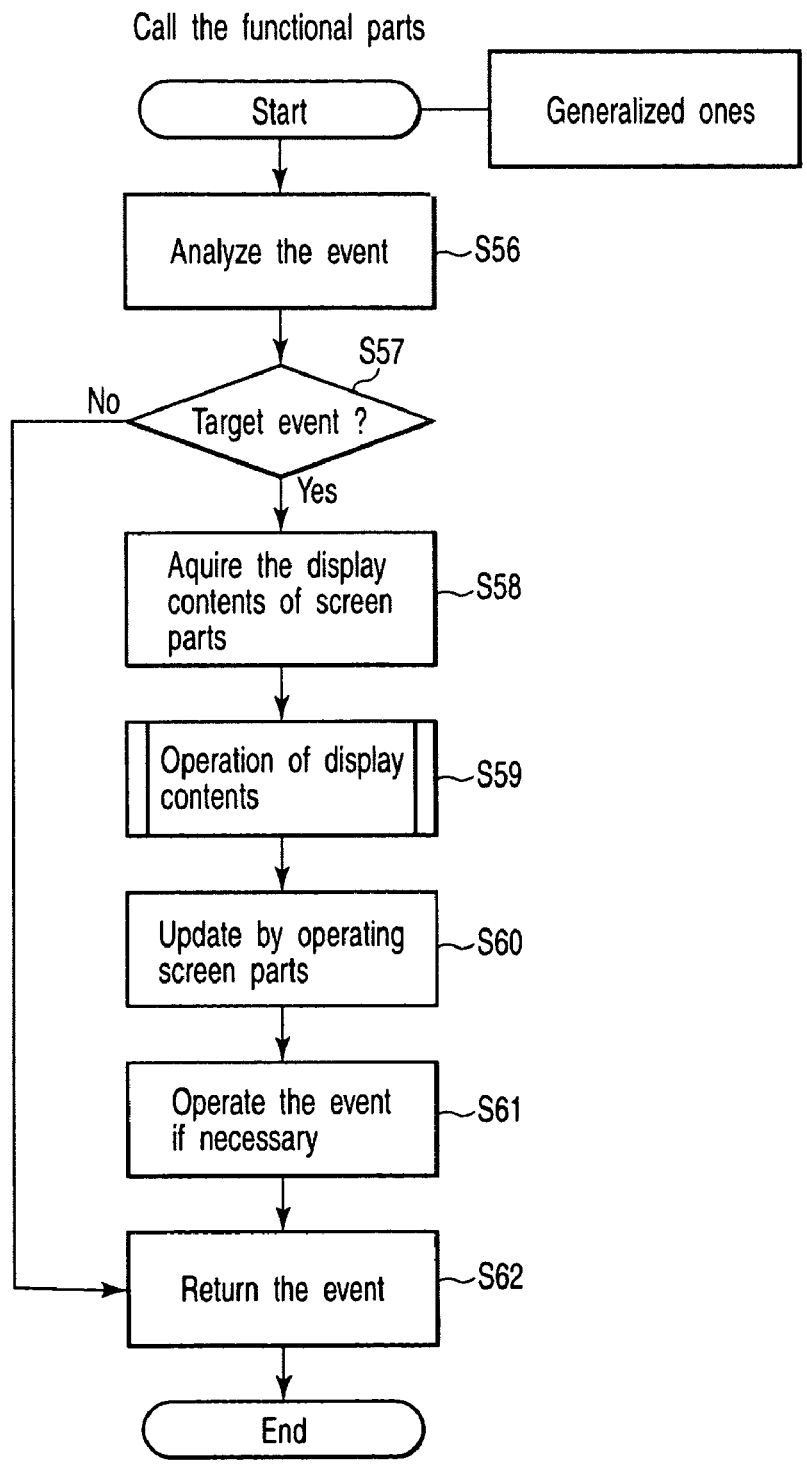
Figure 10:
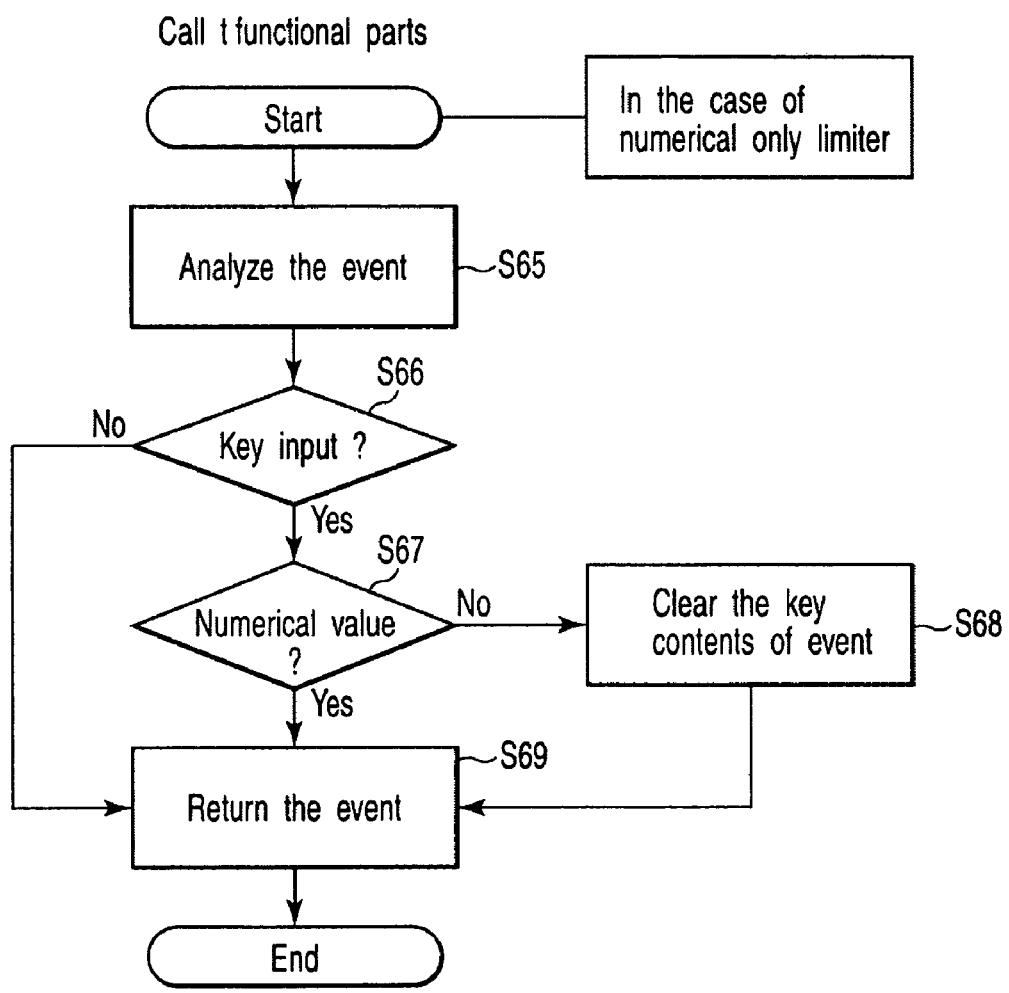
Figure 12:
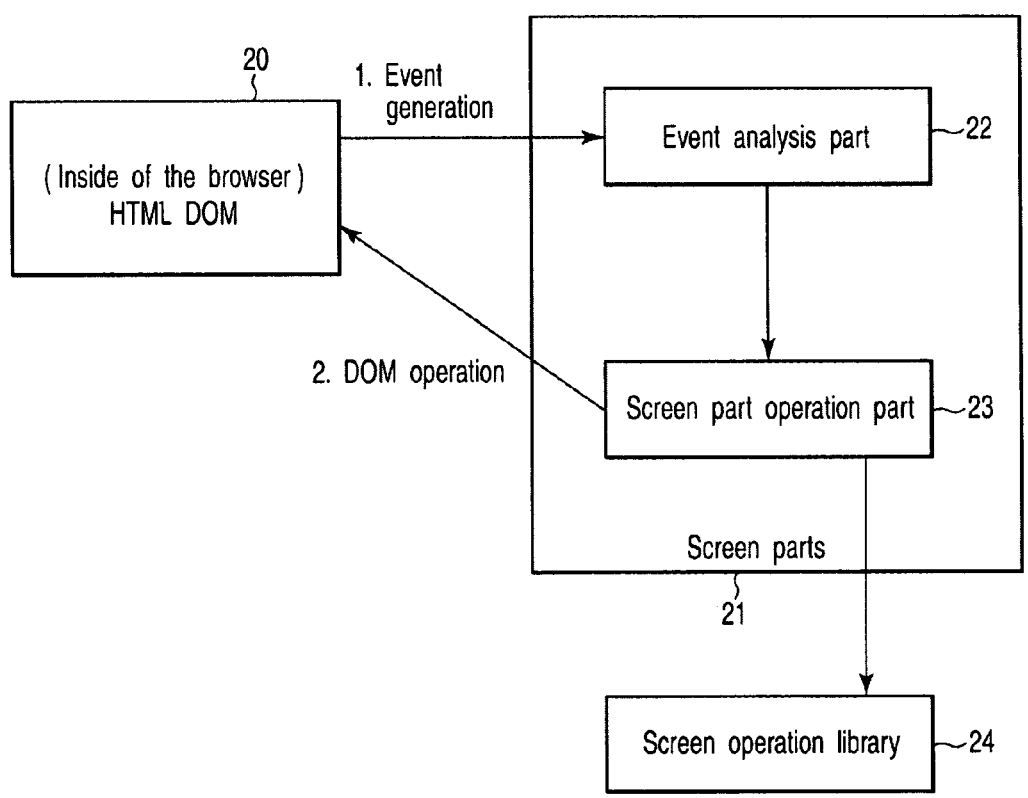
FIG. 12 is a diagram of a conventional event processing by a web browser.

FIG. 8 to FIG. 10 is a detailed flow chart to show the operation when the screen display and the event are generated, according to an embodiment.

FIG. 8 shows the entire operation. First of all, in S50, when it is detected that the event was generated in HTML DOM, the event is received with the screen parts in S51. Next, S53 to call the functional parts registered in the screen parts is executed in the loop between the S52 and S54. When the processing of all the functional parts registered in the screen parts ends, the control comes off the loop, it returns to the default operation to the event in S55, and the processing is ended.

FIG. 9 is a flow chart to show the detailed call of the functional parts. In S56, the event is analyzed, and in S57, it is judged whether the generated event is a target event of the processing of the functional parts. The target event is different according to the functional part, for example, "is it key input?" or "Is it mouse drag?", etc. are judged. When the judgment of S57 is No, it proceeds to S62. When the judgment of S57 is Yes, the display contents of the screen parts are acquired in S58, and the display contents are operated in S59. In the case of mask input, when the key value and the mask contents are matched and displayed, the cursor position is adjusted at the same time. To check the input value, the display contents are checked and the contents are operated if necessary. In the case of drag & drop, the position of the screen parts follows to the mouse for drag & drop and it is moved. In the case of automatic supplementation, a candidate for automatic supplementation is acquired from the server etc. In the case of the automatic format of input values, the display contents are operated and reflected in the screen parts. In the case of automatic escape of cursor, if specified number of characters are input, the screen parts are instructed to displace the focus. In S60, the screen parts are operated and updated. In S61, the event is operated if necessary, and in S62, the event is returned and the processing is ended.

FIG. 9 showed the general call processing of the functional parts, though FIG. 10 explains the case in which the functional parts perform processing to set a limit to an input as not a text but only a numerical value is accepted (for abovementioned NumericalOnlyLimiter).

In S65 in FIG. 10, the generated event is analyzed, and it is judged whether the event is key input or not in S66. When the judgment result of S66 is No, it proceeds to S69. When the judgment result of S66 is Yes, it is judged whether the key input character is a numerical value or not in S67. When the judgment result of S67 is Yes, it proceeds to S69. When the judgment result of S67 is No, the key contents of the event are cleared in S68, the event is returned, and the processing is ended in S69.

A method, apparatus, and computer-readable medium according to the embodiments are provided. The embodiments are implemented in computing hardware and/or software. According to an aspect of an embodiment, a computer comprising a controller executes instructions (program/software) displaying a user interface and processing user interface events according to the described operations.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A computer-readable medium storing a program for a display screen generating apparatus to configure a display screen having multiple functions displayed on a computer, according to operations comprising:

analyzing a screen part definition configured to include a target attribute that specifies a functional part identifier, a functional part definition configured to include a target attribute that specifies a screen part identifier, or any combination thereof, for adding a function to a screen part;

processing per display screen the screen part for displaying the display screen, and receiving an event from a user; and processing, for the screen part, the functional part separately from the screen part by:

associating the functional part with the screen part per content of the event received via the screen part, using the identifier of the screen part specified in the target attribute of the functional part as a target association destination, using the identifier of the functional part specified in the target attribute of the screen part as a target association destination, or any combination thereof, processing the event based on the content of the event, and passing a processing result to the screen part for reflecting a processing result on the screen display.

2. The computer-readable medium according to claim 1, wherein the screen part and the functional part are described in JAVASCRIPT.

3. A display screen generating apparatus that configures the display screen having multiple functions displayed on a computer screen, comprising:

screen part means for including a target attribute that specifies a functional part identifier, functional part means for including a target attribute that specifies a screen part identifier, or any combination thereof, for adding a function to screen part means;

means for processing the screen part means for displaying the display screen and receiving an event input from the user; and means for processing, for the screen part means, the functional part means separately from the screen part means by:

associating the functional part means provided per content of the event received via the screen part means, using the identifier of the screen part means specified in the target attribute of the functional part means as target association destination, using the identifier of the functional part means specified in the target attribute of the screen part means as a target association destination, or any combinations thereof, processing the event based on the content of the event, and passing a processing result to the screen part means for reflecting the processing result on the screen display.

4. The display screen generating apparatus according to claim 3, wherein the screen part means and the functional part means are described in JAVASCRIPT.

5. An apparatus generating a computer display screen having multiple functions, comprising:
a controller configured to:
analyze a screen part definition configured to include a target attribute that specifies a functional part identifier, a functional part definition configured to include a target attribute that specifies a screen part identifier, or any combination thereof, for adding a function to a screen part;
process per display screen the screen part for displaying the display screen, and receiving an event from a user; and
processing, for the screen part, the functional part separately from the screen part by:
associating the functional part with the screen part per content of event received via the screen part, using the identifier of the screen part specified in the target attribute of the functional part as a target association destination, using the identifier of the functional specified part in the target attribute of the screen part as a target association destination, or any combination thereof,
processing the event based on the content of the event, and
passing a processing result to the screen part for reflecting the processing result on the screen display.

6. A method of generating a computer display screen having multiple functions, comprising:
specifying a screen part that includes a target attribute that specifies a functional part identifier, and a functional part that is separate from the screen part and includes a target attribute that specifies a screen part identifier;
processing per display screen the screen part for displaying the display screen, and receiving an event from a user; and
processing, for the screen part, the functional part separately from the screen part by:
associating the functional part with the screen part per content of event received via the screen part, using the identifier of the screen part specified in the target attribute of the functional part as a target association destination, using the identifier of the functional part specified in the target attribute of the screen part as a target association destination, or any combination thereof,
processing the event based on the content of the event, and
passing a processing result to the screen part for reflecting the processing result on the screen display.

* * * * *

UNITED STATES PATENT AND TRADEMARK OFFICE
CERTIFICATE OF CORRECTION

| | |
|---|---|
| PATENT NO. | : 8,078,987 B2 |
| APPLICATION NO. | : 11/970931 |
| DATED | : December 13, 2011 |
| INVENTOR(S) | : Takahide Matsutsuka |

It is certified that error appears in the above-identified patent and that said Letters Patent is hereby corrected as shown below:

Column 8, Line 61, In Claim 3, after "means as" insert -- a --.

Signed and Sealed this
Fifth Day of June, 2012

David J. Kappos
*Director of the United States Patent and Trademark Office*